United States Patent
Münzel et al.

[11] Patent Number: 5,937,275
[45] Date of Patent: Aug. 10, 1999

[54] METHOD OF PRODUCING ACCELERATION SENSORS

[75] Inventors: Horst Münzel, Reutlingen; Michael Offenberg, Tübingen; Klaus Heyers, Reutlingen; Bernhard Elsner, Kornwestheim; Markus Lutz, Reutlingen; Helmut Skapa, Reutlingen; Heinz-Georg Vossenberg, Reutlingen; Nicholas Buchan, Reutlingen; Eckhard Graf, Gomaringen, all of Germany

[73] Assignee: Robert Bosch GmbH, Stuttgart, Germany

[21] Appl. No.: 08/809,945

[22] PCT Filed: Jul. 9, 1996

[86] PCT No.: PCT/DE96/01236

§ 371 Date: Oct. 27, 1997

§ 102(e) Date: Oct. 27, 1997

[87] PCT Pub. No.: WO97/04319

PCT Pub. Date: Feb. 6, 1997

[30] Foreign Application Priority Data

Jul. 21, 1995 [DE] Germany ............... 195 26 691

[51] Int. Cl.⁶ .......................... G01L 23/10; G01P 15/09
[52] U.S. Cl. ......................... 438/50; 438/52; 438/53
[58] Field of Search ................. 438/50, 51, 52, 438/53; 73/514.01, 514.16, 662; 310/329

[56] References Cited

U.S. PATENT DOCUMENTS

| | | |
|---|---|---|
| 5,792,675 | 8/1998 | Offenberg . |
| 5,804,457 | 9/1998 | Benz et al. . |
| 5,827,756 | 10/1998 | Sugino et al. . |
| 5,840,597 | 11/1998 | Hartauer . |

FOREIGN PATENT DOCUMENTS 4318466   8/1994   Germany .

*Primary Examiner*—Charles Bowers
*Assistant Examiner*—Martin Sulsky
*Attorney, Agent, or Firm*—Michael J. Striker

[57] ABSTRACT

A method for producing acceleration sensors is proposed, in which a silicon layer that is deposited in an epitaxial application system is used. Above sacrificial layers (2) applied to the substrate (1), the material grows in the form of a polysilicon layer (6), which has a certain surface roughness. By application of a photoresist and by a wet etching process, this surface roughness is eliminated. Alternatively, chemical-mechanical smoothing is contemplated.

12 Claims, 4 Drawing Sheets

METHOD OF PRODUCING ACCELERATION SENSORS

PRIOR ART

The invention is based on a method as generically defined by the preamble to the main claim.

From German Patent Disclosure DE 43 18 466, a method for producing a micromechanical sensor is already known in which a substrate with a sacrificial layer is used. In an epitaxial application system, a silicon layer is deposited on this substrate. Above the sacrificial layer, this silicon layer grows in the form of a polysilicon layer. As the substrate, a monocrystalline silicon wafer is used, so that the silicon material, in the regions where it has immediate content with the substrate, grows in the form of monocrystalline silicon.

ADVANTAGES OF THE INVENTION

The method according to the invention having the characteristics of the independent claim has the advantage over the prior art that smoothing of the polysilicon layer is attained. As a result of the smoothing, the structures for the sensors can be made in the polysilicon layer with especially high precision. High-quality sensor structures can thus be produced with great precision.

By the provisions recited in the dependent claims, advantageous further features of and improvements to the method disclosed in the independent claim are possible. Especially precisely, the structuring of the polysilicon layer is done by a plasma etching process. To improve the quality of the polysilicon layer from the very outset, a polysilicon starter layer may be provided on the sacrificial layer. By using a sacrificial layer, which covers the entire surface of the substrate, an especially simple method for producing sensors is disclosed. When a structured sacrificial layer is used, the sensor structures can be anchored especially well to the surface of the substrate. By using monocrystalline silicon as a wafer, anchored regions are created that comprise monocrystalline silicon. This method has especially good properties. By leveling the polycrystalline layer until it forms a single plane with the monocrystalline layer, an especially high-quality surface is created that is especially highly suitable for further processing. In particular, electronic circuits can then be made in the monocrystalline silicon layer and can be connected to the sensor structures with surface-mounted or buried conductor tracks.

DRAWINGS

Exemplary embodiments of the invention are shown in the drawings and described in further detail in the ensuing description.

DESCRIPTION OF THE EXEMPLARY EMBODIMENTS

Figure 1:
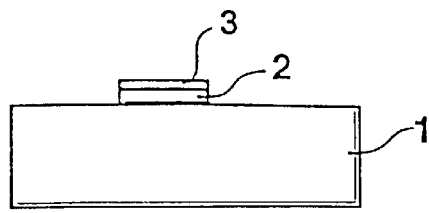
FIGS. 1–3 show the production method known from the prior art (DE 43 18 466)

In FIG. 1, a substrate 1 is shown on which a sacrificial layer 2 is applied. Over the sacrificial layer, a polysilicon starter layer 3 is applied. It will be assumed hereinafter that the substrate 1 is a monocrystalline silicon substrate. However, other types of substrates of ceramic materials, glass or metal are usable in principle as well. The sacrificial layer shown here is provided only in individual regions of the top side of the substrate 1. However, it is equally possible for the sacrificial layer 2 to cover the entire surface of the substrate 1. The polysilicon starter layer 3 is applied to the sacrificial layer 2 in order to improve the quality of the ensuing deposition of silicon. However, the method can also be performed without this polysilicon starter layer.

Any materials that can be etched selectively to silicon are conceivable as material for the sacrificial layer 2, especially silicon oxide, silicon nitride, glass or metals. The polysilicon starter layer 3 is preferably deposited in an LPCVD (low-pressure chemical vapor deposition) reactor, since such deposits can be made on arbitrary surfaces at low temperatures.

The substrate of FIG. 1 is introduced into an epitaxial application system, in which a silicon layer 4 is then deposited. Such epitaxial application systems are conventionally used in semiconductor technology to deposit monocrystalline epitaxial layers on monocrystalline silicon wafers. On monocrystalline silicon wafers, the layers grow in the form of monocrystalline silicon layers. If other substrates that are not monocrystalline silicon materials are used, then a silicon layer that has a polycrystalline structure is deposited. In FIG. 1, a substrate 1 that is partly covered with a sacrificial layer 2 is used. A monocrystalline silicon layer 5 grows in the regions where the layer 4 is directly in contact with the monocrystalline substrate 1. Above the sacrificial layer 2 or polysilicon starter layer 3, a polycrystalline silicon layer 6 grows. The growth proceeds such that the polycrystalline region 6 still extends slightly to both sides of the sacrificial layer 2 or polysilicon starting layer 2. This is shown in FIG. 2.

After the deposition of the silicon layer 4, a photoresist layer 7 is applied and structured. This photoresist layer then serves as an etching mask for an ensuing etching step.

Figure 3:
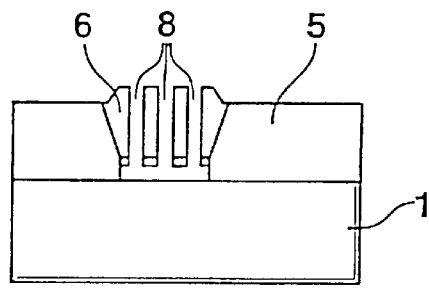

FIG. 3 shows trench structures 8 which have been etched into the polysilicon layer 6. Etching of the trench structures 8 is preferably done by a plasma etching process, since such processes allow the making of especially deep, narrow trenches. After the trench structures 8 have been etched in, the sacrificial layer 2 is dissolved out. This is done by a wet chemical or plasma etching process. Vapors, such as hydrofluoric acid vapor, can also be used.

Figure 2:
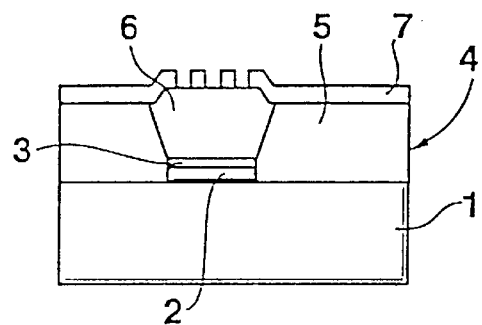

The course of the former process described in conjunction with FIGS. 1–3 is also already known from DE 43 18 466.

Figure 4:
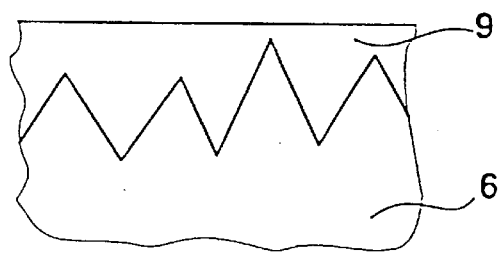
FIGS. 4 and 5 show the etching step according to the invention.

In FIG. 4, the surface of the polycrystalline silicon layer 6 is shown on a larger scale. As can be seen, the surface of the polycrystalline silicon layer 6 has a structure with a large particle size, which is dictated by the polycrystalline structure of the polysilicon layer 6. The surface roughness of such layers may be on the order of magnitude of a few micrometers. The photoresist layer 7 known from FIG. 2 is as a rule structured by optical methods. Because of the surface roughness, the desired structure cannot be projected onto a defined plane, and scattering of light occurs. In the case of a rough surface, the accuracy of structuring of the photoresist layer 7 is accordingly limited. Since for sensors, especially acceleration sensors, structural widths of a few micrometers are used and these must be made precisely to a few tenths of a micrometer, it is an object to reduce the surface roughness.

Figure 5:
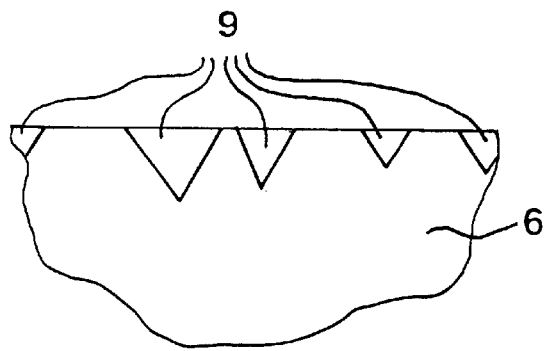

To that end, it is shown in FIG. 4 that in an intermediate step, one further photoresist layer 9 is applied. A plasma etching step is then performed, and for this plasma etching step the etching parameters are selected such that polysilicon 6 and photoresist 9 are etched at the same etching rates. In FIG. 5, an intermediate step of this etching process is shown. The smoothing action of the etching process is based on the fact that the photoresist is first applied as a liquid and thus after hardening forms a smooth surface. Since the etching rate of photoresist and polysilicon is the same, this smooth surface is transferred to the polysilicon itself by the etching process. The smoothing step is performed for the deposited silicon layer, before the photoresist layer 7 for etching the trenches 8 is applied. As a result of the thus-smoothed surface of the polysilicon layer 6, especially precise structuring of the photoresist layer 7 and thus especially precise structuring of the etching trenches 8 can be done.

For the plasma etching, a gas mixture of $SF_6$ and oxygen is for instance possible. The etching rates of polysilicon and photoresist can be adapted to one another by varying the ratio of the two etching gases to one another.

Figure 9:
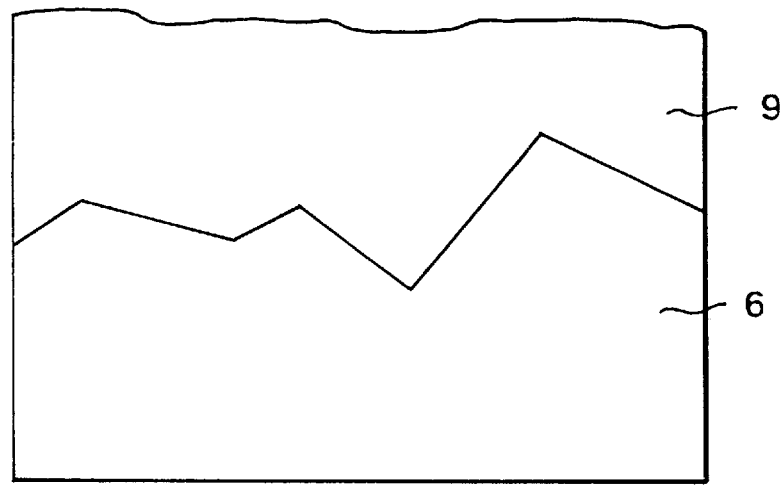

In FIGS. 9–12, a further improved smoothing process is shown. It is assumed here that the polycrystalline silicon layer 6 has an extremely large particle size. Over this polycrystalline silicon layer 6, a photoresist layer 9 is applied. Because of the extreme irregularity of the polysilicon layer 6, the photoresist layer 9 also has an irregularity of its surface, although to a markedly lesser extent and with a more rounded nature. At very coarse surface roughnesses, such a photoresist surface cannot be avoided entirely even if an especially low-viscosity photoresist is chosen. This is shown in FIG. 9.

Figure 10:
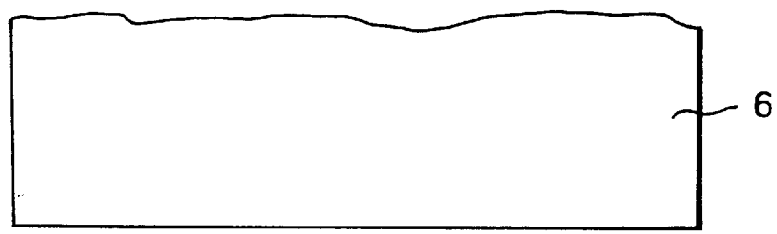

A plasma etching step is then done; for this plasma etching step, the etching parameters are selected such that polysilicon 6 and photoresist 9 are etched at the same etching rate. The resultant polysilicon layer 6 is shown in FIG. 10. The polysilicon layer 6 has been markedly smoothed, but a certain residual waviness still exists.

Figure 11:
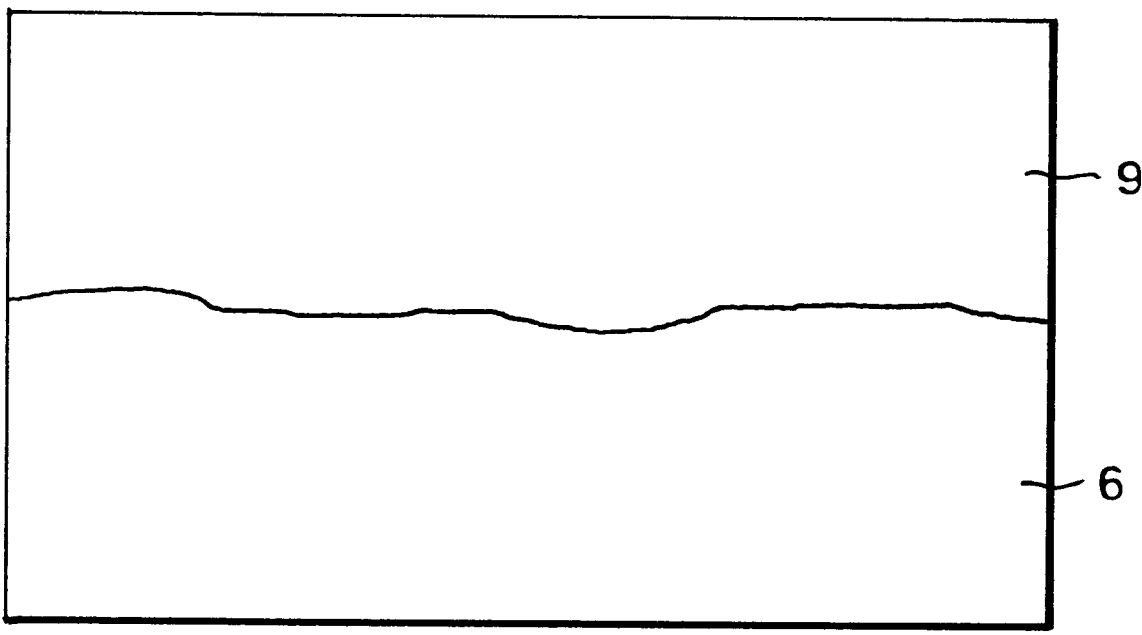

Despite the remaining residual waviness, markedly improved trench structures 8 can now be made. Still further improvement, however, is attained by applying another photoresist layer 9 to the polysilicon layer 6. Since the surface irregularities to be compensated for are slight, the surface of the photoresist layer 9 is now planar. This is shown in FIG. 11.

Figure 12:
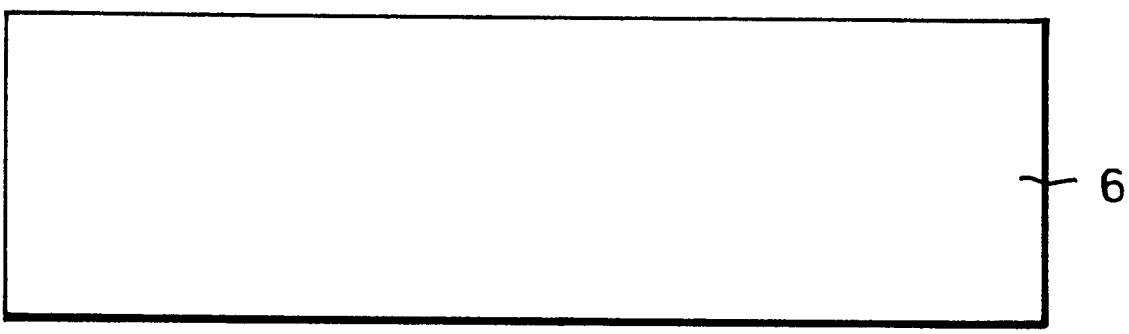

Once again, an etching step ensues, the etching parameters being selected such that the polysilicon 6 and photoresist 9 are etched at the same etching rate. In FIG. 12, the polysilicon layer 6 is shown after the completion of this etching step. The now-smooth surface of the polysilicon layer 6 enables still further-improved structuring.

As a result of the two-step smoothing process, the further optimization option is also offered of adapting the viscosity and the surface tension of the photoresist and the etching method to the roughness to be compensated for. For instance, the photoresist for the first smoothing step can be selected as somewhat lower in viscosity, in order to compensate for the greater roughnesses.

Another possibility for smoothing the surface of the polysilicon layer 6 is a chemical-mechanical polishing process. Polishing devices of the kind known for instance from metallurgy for polishing ground metal surfaces that are examined optimally, or in semiconductor physics, can be used. This polishing device has a rotating polishing table that is provided with an elastic polishing overlay. The polishing overlay is saturated with a polishing agent. The polysilicon surface to be machined is pressed against the polishing overlay. In contrast to purely mechanical polishing which has been employed for a long time, this polishing agent contains both polishing grains and active chemical additives. To keep light scattering slight, it is recommended that polishing particles with the smallest possible diameter be selected. This chemical-mechanical surface treatment likewise leads to a surface of the polysilicon layer 6 that permits very fine structuring in an ensuing step.

A surprising aspect here is that even microstructured components can be machined. At the beginning of the polishing process, the component has a shoulder which could offer an engagement point for damage during polishing. In the further course of the polishing process, however, this shoulder is reduced and the polysilicon is smoothed. It is recommended that the polishing process be ended before the shoulder has been leveled completely. The surface is then smooth enough to achieve the intended improvement in optical structuring, yet at the same time the small shoulder can be used as an adjustment mark.

Figure 6:
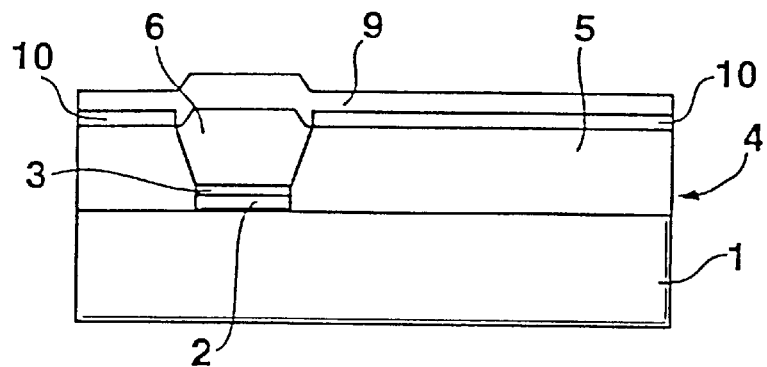
FIGS. 6 and 7 show the leveling of the polysilicon layer and monocrystalline silicon layer.
Figure 7:
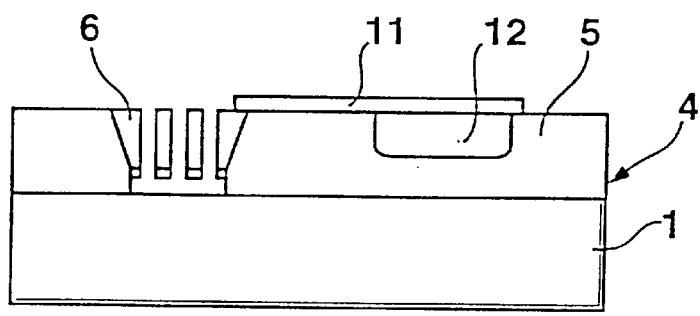

In FIGS. 6 and 7, a further exemplary embodiment of the method of the invention is shown. The substrate 1, the sacrificial layer 2, the polysilicon starter layer 3, and the silicon layer 4 with the monocrystalline silicon layer 5 and the polycrystalline silicon layer 6 again correspond to the layers as known from FIGS. 1–3. However, onto the surface of the silicon layer 4, a further masking layer 10 is applied as well; it comprises a material that has a particularly low etching rate in the ensuing smoothing etching process. This masking layer 10, which may for instance comprise silicon oxide or a thick resist layer, leaves the polycrystalline region 6 largely free, however. After that, a photoresist layer 9 is again applied. In the ensuing smoothing etching step, in which the photoresist layers 9 is etched at the same etching rate as the polysilicon material 6, again leads to smoothing of the polycrystalline silicon 6. The process is continued, however, until such time as the polysilicon layer 6 forms a smooth surface with the monocrystalline silicon layer 5. This situation is shown in FIG. 7. The polycrystalline silicon layer 6 and the monocrystalline silicon layer 5 now form one common, flat surface. Onto this surface, conductor track structures 11 can be deposited especially simply; they no longer need to overcome any difference in height between these two silicon layers. This method is therefore especially suitable if integrated semiconductor elements 12, by which an evaluation of the sensor structure in the polysilicon layer 6 is to be performed, are provided in the monocrystalline silicon layer 5.

Figure 8:
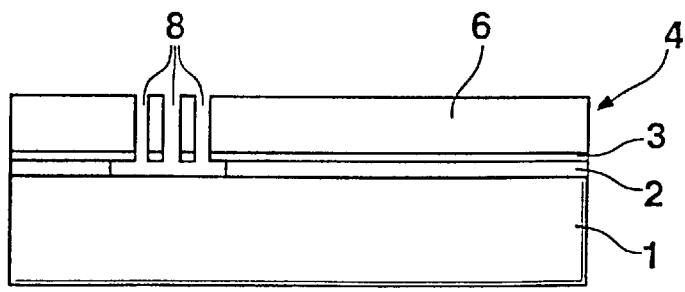
FIG. 8 shows the method with a full-surface sacrificial layer on the substrate.

In FIG. 8, a further exemplary embodiment of the method of the invention is shown. On a substrate 1, a sacrificial layer 2 is to that end is applied that covers the entire surface of the substrate 1. Over the sacrificial layer 2, a silicon layer 4 is then applied in an epitaxial reactor; this layer grows over the entire surface in the form of a polycrystalline layer 6. Before the deposition of the silicon layer 4, it is also possible, as shown in FIG. 8, for a polycrystalline starter layer 3 to be applied. A smoothing step then follows, with which the surface roughness of the entire surface of the polycrystalline silicon layer 6 is smoothed. This smoothing step corresponds to the method as described in conjunction with FIGS. 4 and 5 above. In a further step, trench structures 8 are then etched, extending from the top side of the polycrystalline silicon layer 6 as far as the sacrificial layer 2. In a further etching step, the sacrificial layer 2 under the etched-in structures in the polysilicon layer 6 is then removed. This step of etching the sacrificial layer is done by bringing an etching solution to the sacrificial layer 2 through the etched trench structures 8. This etching solution dissolves the sacrificial layer 2, and beginning at the trench structures 8, lateral underetching underneath the polycrystalline silicon layer 6 takes place only slowly. The underetching ends as soon as the sacrificial layer 2 underneath the etched-in structures has been removed, yet when the other, larger-area regions of the polycrystalline layer 6 have not yet been underetched. Since structuring of the sacrificial layer 2 is unnecessary in this method, this method is especially simple.

We claim:

1. A method for producing sensors, especially acceleration sensors in which on a substrate (1) with a sacrificial layer (2), in an epitaxial application system, a silicon layer (4) is deposited that is deposited above the sacrificial layer (2) as a polysilicon layer (6), a first photoresist layer (7) being applied to the polysilicon layer (6) and being structured by optical methods as an etching mask, and structures (8) being introduced into the polysilicon layer (6) through the etching mask, which structures extend from the top side of the polysilicon layer (6) as far as the sacrificial layer (2), a sacrificial layer (2) being removed from beneath the structures (8), characterized in that the surface of the polysilicon layer (6) is post-machined in a smoothing process before the first photoresist layer (7) is applied.

2. The method of claim 1, characterized in that the smoothing process is effected in that a photoresist (9) is applied, and an etching process is performed which etches the polysilicon layer (6) and the photoresist (9) at approximately the same etching rate.

3. The method of claim 2, characterized in that after etching of the photoresist (9), a further layer of photoresist (9) is applied and a further etching process is formed.

4. The method of claim 2, characterized in that the etching process is performed as a plasma etching process.

5. The method of claim 1, characterized in that the smoothing process is effected by chemical-mechanical polishing.

6. The method of claim 1, characterized in that a polysilicon starter layer (3) is deposited on the sacrificial layer (2) before the deposition of the silicon layer (4) in the epitaxial application system.

7. The method of claim 1, characterized in that the sacrificial layer (2) covers the entire surface of the substrate (1).

8. The method of claim 1, characterized in that the sacrificial layer (2) is structured before the deposition of the silicon layer (4) in the epitaxial application system.

9. The method of claim 8, characterized in that the substrate (1) comprises monocrystalline silicon, and that the silicon layer (4), in those regions where no sacrificial layer (2) is provided, grows in the form of a monocrystalline silicon layer (5).

10. The method of claim 9, characterized in that the smoothing step of the polysilicon layer (6) is performed until such time as the polycrystalline silicon layer (6) and the monocrystalline silicon layer (5) form a common, flat surface.

11. The method of claim 10, characterized in that electronic circuits (12) are formed in the monocrystalline silicon layer (5), and that on the common, flat surface, conductor tracks (11) are provided, extending from the circuits (12) as far as the polysilicon layer (6).

12. The method of claim 1, characterized in that after the smoothing process, a small shoulder remains between the polysilicon layer (6) and the monocrystalline silicon layer (5), which shoulder is used as an adjusting mark.

\* \* \* \* \*